United States Patent
U S et al.

(10) Patent No.: US 9,098,919 B2
(45) Date of Patent: Aug. 4, 2015

(54) DETECTING MOTION IN A HIGH RESOLUTION VIDEO

(71) Applicant: Honeywell International Inc., Morristown, NJ (US)

(72) Inventors: Yadhunandan U S, Tirupati (IN); Gurumurthy Swaminathan, Bangalore (IN); Ben A. Miller, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 61 days.

(21) Appl. No.: 13/644,886

(22) Filed: Oct. 4, 2012

(65) Prior Publication Data

US 2014/0098999 A1 Apr. 10, 2014

(51) Int. Cl.
*G06T 7/20* (2006.01)
*H04N 5/14* (2006.01)

(52) U.S. Cl.
CPC ............. *G06T 7/2006* (2013.01); *G06T 7/2013* (2013.01); *H04N 5/14* (2013.01); *G06T 2207/20144* (2013.01)

(58) Field of Classification Search
None
See application file for complete search history.

(56) References Cited

U.S. PATENT DOCUMENTS

| | | | |
|---|---|---|---|
| 7,853,042 B2* | 12/2010 | Parameswaran et al. | 382/103 |
| 2006/0262959 A1* | 11/2006 | Tuzel et al. | 382/103 |
| 2008/0285797 A1* | 11/2008 | Hammadou | 382/103 |
| 2009/0147994 A1* | 6/2009 | Gupta et al. | 382/103 |
| 2009/0219387 A1 | 9/2009 | Marman et al. | |

OTHER PUBLICATIONS

Elgammal et al ("Background and Foreground Modeling Using Nonparametric Kernel Density Estimation for Visual Surveillance", 2002).*
P. Varcheie, et al., "A Multiscale Region-Based Motion Detection and Background Subtraction Algorithm", Sensors ISSN 1424-8220, Jan. 28, 2010 (21 pages).

* cited by examiner

*Primary Examiner* — Avinash Yentrapati
(74) *Attorney, Agent, or Firm* — Brooks, Cameron & Huebsch, PLLC

(57) ABSTRACT

Devices, methods, and systems for detecting motion in a high resolution video are described herein. One method includes dividing an image frame of a high resolution video into a number of blocks, determining whether motion is present in each of the blocks, and identifying, within each block in which motion is determined to be present, pixels in which motion is present.

19 Claims, 2 Drawing Sheets

DETECTING MOTION IN A HIGH RESOLUTION VIDEO

TECHNICAL FIELD

The present disclosure relates to devices, methods, and systems for detecting motion in a high resolution video.

BACKGROUND

Many methods have been developed for detecting motion in low resolution videos, such as common intermediate format (CIF) and video graphics array (VGA) resolution videos having a frame rate of greater than 25 frames per second (fps), among other types of low resolution videos. Such previous motion detection approaches can be effectively used to detect motion in low resolution videos in real time (e.g., at real time speeds).

However, when such previous motion detection approaches are applied to high resolution videos, such as 2, 3, or 5 megapixel (MP) resolution videos having a frame rate of approximately 10 fps, among other types of high resolution videos, they may be more computationally intensive and/or take more computational time than when applied to low resolution videos. As a result of the increased computational intensity and/or time, such previous motion detection approaches may not be able to effectively detect motion in high resolution videos in real time (e.g., such previous motion detection approaches may fail at real time speeds for high resolution videos). That is, previous motion detection approaches that can effectively detect motion in low resolution videos in real time may not be able to effectively detect motion in high resolution videos in real time.

DETAILED DESCRIPTION

Figure 1:
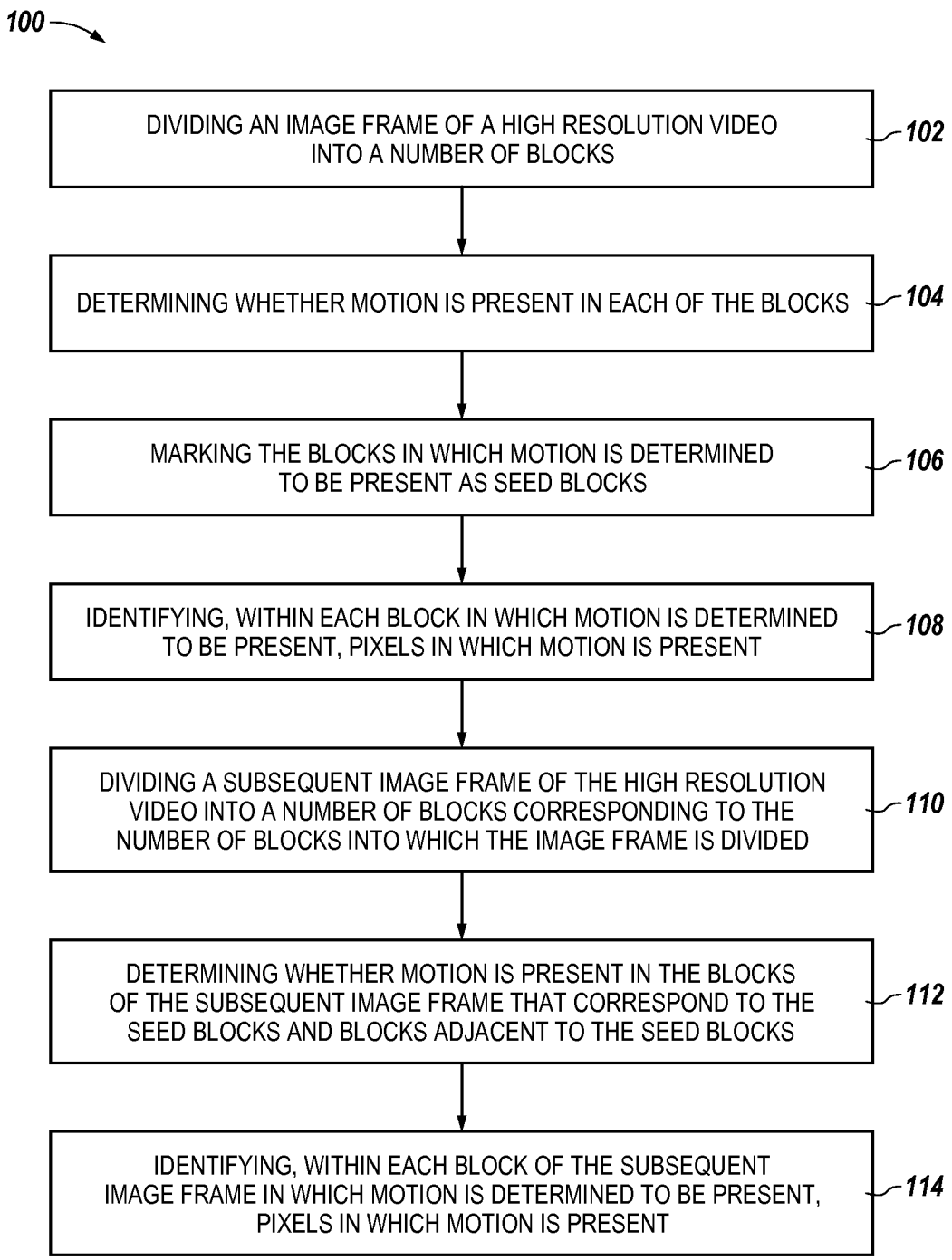
FIG. 1 illustrates a method for detecting motion in a high resolution video in accordance with one or more embodiments of the present disclosure.

Devices, methods, and systems for detecting motion in a high resolution video are described herein. For example, one or more embodiments include dividing an image frame of a high resolution video into a number of blocks, determining whether motion is present in each of the blocks, and identifying, within each block in which motion is determined to be present, pixels in which motion is present.

Motion detection in accordance with one or more embodiments of the present disclosure can be less computationally intense and/or use less computational time as compared with previous motion detection approaches. Accordingly, motion detection in accordance with one or more embodiments of the present disclosure can effectively detect motion in high resolution videos in real time (e.g., at real time speeds).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of blocks" can refer to one or more blocks.

FIG. 1 illustrates a method 100 for detecting motion in a high resolution video in accordance with one or more embodiments of the present disclosure. Method 100 can be performed, for example, by a computing device, such as computing device 220 further described herein (e.g., in connection with FIG. 2).

As used herein, a high resolution video can include, for example, a video having a resolution of at least a megapixel (MP), such as a 2, 3, or 5 MP resolution, and/or a video having a frame rate of approximately 10 frames per second (fps). However, embodiments of the present disclosure are not limited to a particular type of high resolution video. In contrast, low resolution videos may include, for example, videos having a common intermediate format (CIF) or video graphics array (VGA) resolution, and/or videos having a frame rate of greater than 25 fps, among other types of low resolution videos.

At block 102, method 100 includes dividing an image frame of a high resolution video into a number (e.g., a plurality) of blocks. Each of the blocks can be the same size (e.g., each of the blocks can have the same width and height) and/or include the same number of pixels. The image frame can be the first (e.g., initial) frame of the video, or a subsequent frame of the video.

At block 104, method 100 includes determining whether motion is present in each of the blocks (e.g., determining whether each block contains motion and/or is affected by motion). The determination of whether motion is present in the blocks can be made, for example, using a histogram based motion detection method. For instance, the histogram based motion detection method can be applied to each of the blocks to determine whether motion is present therein.

As an example, the histogram based motion detection method can include building (e.g., computing) a separate histogram for each of the blocks, and comparing the histogram for each block to a histogram model for that block. The histogram built for each block can include a number of bins, wherein each bin is associated with (e.g., deals with) an interval of intensities. The histogram model for each block can include a number (e.g., a set) of histogram bin vectors (e.g., vectors with bin values) and their corresponding weights (e.g., each histogram bin vector of the histogram model can have a corresponding weight). These histogram bin vectors in the histogram model can be referred to as representative histogram bins (e.g., vectors).

The histogram model for each block (e.g., the number of histogram bin vectors) can be built (e.g., arrived at) during an initialization (e.g., training) phase (e.g., session) and stored in a database. For example, during the initialization phase, a number of initial (e.g., training) image frames of the high resolution video can be divided into a number of blocks, and the histograms of the same block in each of the training image frames can be used to build the initial histogram model for that block. That is, all the histograms of a particular block in the training image frames can be used to build the initial histogram model for that block. Further, each of the histograms of the particular block can be given equal weight in building the initial histogram model for that block (e.g., each of the histograms of the particular block can be inserted into the initial histogram model for that block with equal weight). That is, each histogram bin vector of the initial histogram model for the particular block can have an equal weight (e.g., the equal weights are for the first histograms which enter the model). For example, if the histogram model includes five representative histograms, then the first five histogram bin vectors from the training phase will go into the five slots of the model with equal weights. After this, the model will be updated, as will be further described herein.

In the training phase, each new training histogram can be compared with the histogram model (e.g., the distance between the current histograms and the representative histograms in the model can be computed). If the distance to any representative histogram in the model is below a particular threshold (which indicates a match), then the weight of the representative histogram in the model can be increased, and if the distance to any representative histogram is above the particular threshold, the weight of the representative histogram can be decreased. Further, if the lowest weight in the model is below a particular threshold, then the model can be updated by replacing the representative histogram having the lowest weight with the first histogram, which has a distance to all representative histograms above the particular threshold. This may mean there is no match for that vector in the model. Accordingly, a representative histogram with a weight below a threshold can be replaced with this.

The distance between the histogram and the histogram model can be determined, for example, using a minimum distance of pair assignments (MDPA) distance measurement, which can take into consideration (e.g., account for) the characteristics of the histogram, such as the error distribution among the bins of the histogram. As an example, the distance S between two histograms $H_I$ and $H_M$ at a block position of (i, j) having K bins can be given by:

$$S_H(H_I(i,j), H_M(i,j)) = \frac{\sum_{b=0}^{K-1} \left| \sum_{k=0}^{b} (H_I(i,j)[k] - H_M(i,j)[k]) \right|}{\sum_{b=0}^{K-1} H_I(i,j)[b]}$$

Embodiments of the present disclosure, however, are not limited to a particular distance measurement. For example, in some embodiments, the distance between the histogram and the histogram model can be determined using a Chi square distance measurement or a Bhattacharyya distance measurement, among other types of distance measurements.

If the distance between the histogram and the histogram model does not meet or exceed the particular threshold (e.g., if motion is not present in the particular block), the histogram belongs to the background of the image, and the histogram model for that block (e.g., the weights of the histograms used to build the histogram model) can be updated accordingly. If the distance between the histogram and the histogram model meets or exceeds the particular threshold (e.g., if motion is present in the particular block), the histogram can be used to build a foreground model for that block, and the histogram model for that block can be updated accordingly following the same model building and updating process as for the background process (e.g., the histogram can replace the histogram used to build the histogram model that has the lowest weight) and maintained as a histogram model (e.g., a foreground model) for the block. The block can then be monitored for motion over time, and if the block is marked as having motion for a fixed period of time the background model can be replaced by the foreground model for that block.

As an example, a new bin vector can be compared against the bin vectors of the histogram model to determine the bin vector of the histogram model that is most similar to the new bin vector. If a nearest bin vector is found in the histogram model, motion is not present in the block, the weight of the nearest bin vector can be increased. If no match or similar bin vector is found in the histogram model, motion is present in the block, and the new bin vector can replace the bin vector of the histogram model that has the lowest weight. This can be referred to as the histogram updated model during the validation and/or testing process. Further, a separate foreground model of motion vectors can me maintained, and if motion is present in a block for a long period of time, the histogram model for that block can be replaced by the foreground model.

At block 106, method 100 includes marking the blocks in which motion is determined to be present as seed blocks. The blocks marked as seed blocks can be stored in a seed block list.

As an example, if the image frame is the first frame of the high resolution video, all of the blocks into which the image frame as divided (e.g., not just the blocks in which motion is determined to be present) can be marked as seed blocks. However, if the image frame is a subsequent frame of the video, only the blocks in which motion is determined to be present may be marked as seed blocks (e.g., none of the blocks in which motion is not present may be marked as seed blocks).

At block 108, method 100 includes identifying, within each block in which motion is determined to be present, pixels in which motion is present (e.g., identifying the pixels in each block in which motion is determined to be present that contain the motion and/or are affected by the motion). As an example, the identification of the pixels in which motion is present may be performed on only those blocks in which motion is determined to be present (e.g., not on the blocks in which motion is not present). That is, no further motion detection processing may be performed on the blocks in which motion is not present, which can reduce the amount of computational (e.g., processing) time associated with method 100 (e.g., as compared with previous motion detection approaches).

The pixels in which motion is present can be identified, for example, using a fast pixel based motion detection algorithm such as, for instance, a kernel density estimation (KDE) or Gaussian mixture model (GMM) based motion detection algorithm, among other types of motion detection algorithms. For instance, a KDE based motion detection algorithm can be applied to the pixels (e.g, each of the pixels) of each block in which motion is determined to be present to identify the pixels of that block in which motion is present and/or the pixels of that block in which motion is not present. The pixels in which motion is present can comprise (e.g., belong to) the foreground of the image frame, and hence can be used to construct a foreground and/or motion frame. The pixels in which motion is not present can comprise (e.g., belong to) the background of the image frame, and hence can be used to construct a background and/or still frame.

At block 110, method 100 includes dividing a subsequent (e.g., the next) image frame of the high resolution video into a number of blocks corresponding to the number of blocks into which the image frame (e.g., the image frame described in connection with block 102 of method 100) is divided. That is, each block into which the subsequent image frame is divided corresponds to a different one of the blocks into which the image frame is divided. For example, each block of the image frame marked as a seed block during the start of the training process (e.g., as described in connection with block 106 of method 100) can have a block in the subsequent image frame that corresponds to that seed block.

At block 112, method 100 includes determining whether motion is present in the blocks of the subsequent image frame that correspond to the seed blocks and blocks adjacent to (e.g., surrounding) the seed blocks. The determination of whether motion is present in these blocks of the subsequent image frame can be made, for example, using a histogram based motion detection method in a manner analogous to that previously described in connection with block 104 of method 100.

As an example, the determination of whether motion is present in the blocks of the subsequent image frame may be made for only the blocks of the subsequent image frame that correspond to the seed blocks and the blocks adjacent to the seed blocks (e.g., not for the remaining blocks of the subsequent image frame that do not correspond to a seed block or a block adjacent to a seed block). That is, no further motion detection processing may be performed on the remaining blocks of the subsequent image frame that do not correspond to a seed block or a block adjacent to a seed block, which can reduce the amount of computational (e.g., processing) time associated with method 100 (e.g., as compared with previous motion detection approaches.

To detect motion that starts from within an image frame and/or to find missing seed blocks, the entire process can be restarted wherein after a particular number (e.g., a fixed set) of frames, the seed blocks can be reset, all the blocks of the frame can be checked for motion, and a new set of seed blocks can be determined based on the blocks that have motion. This can detect new motion that has started and/or detect any motion that may have been missed earlier. Additionally and/or alternatively, all the boundary blocks of the frame (e.g., all the blocks at the boundary of the frame) may always be treated as seed blocks to check for any motion entering the frame. This can also detect new and/or missed motion.

Blocks adjacent to the seed blocks can include, for example, blocks adjacent to the sides and/or corners of the seed blocks. For example, if all the blocks of the image frame are the same size, a seed block of the image frame could have up to eight adjacent blocks (e.g., a block adjacent each of the sides of the seed block, and a block adjacent each corner of the seed block).

Seed blocks (e.g., blocks of the subsequent image frame corresponding to the seed blocks) having motion present therein can remain marked as seed blocks (e.g., seed blocks having motion present therein can remain in the seed block list). Seed blocks (e.g., blocks of the subsequent image frame corresponding to the seed blocks) not having motion present therein may no longer be marked as seed blocks (e.g., seed blocks not having motion present therein may be removed from the seed block list). Blocks adjacent to the seed blocks (e.g., blocks of the subsequent image frame corresponding to the blocks adjacent to the seed blocks) having motion present therein can be marked as seed blocks (e.g., blocks adjacent to the seed blocks having motion present therein can be added to the seed block list). This can be carried on to a number (e.g., a few) future frames based on preference and/or setting. For example, such blocks can be monitored for another two or three frames in the future.

At block 114, method 100 includes identifying, within each block of the subsequent image frame in which motion is determined to be present, pixels in which motion is present. The pixels in which motion is present can be identified, for example, using a kernel density estimation (KDE) based motion detection algorithm, in a manner analogous to that previously described in connection with block 108 of method 100.

As an example, the identification of the pixels in which motion is present may be performed on only those blocks of the subsequent image in which motion is determined to be present (e.g., not on the blocks in the subsequent image in which motion is not present). That is, no further motion detection processing may be performed on the blocks in which motion is not present, which can reduce the amount of computational (e.g., processing) time associated with method 100 (e.g., as compared with previous motion detection approaches).

Although not illustrated in FIG. 1, in some embodiments, method 100 can return to block 110, and blocks 110, 112, and 114 of method 100 can be repeated for a number of additional subsequent image frames of the high resolution video.

Figure 2:
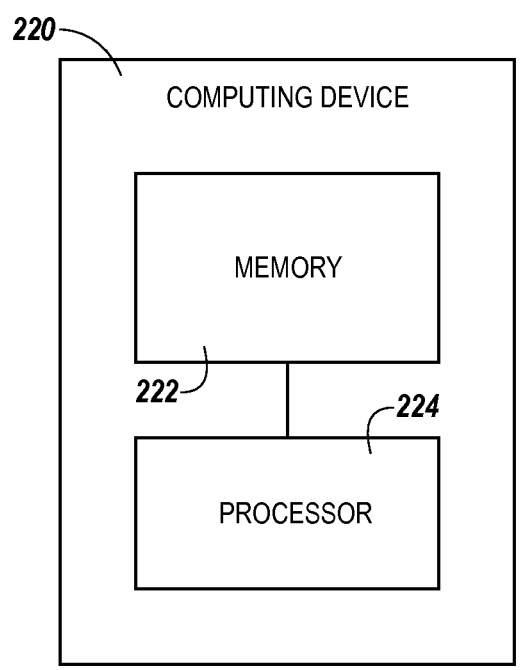
FIG. 2 illustrates a computing device for detecting motion in a high resolution video in accordance with one or more embodiments of the present disclosure.

FIG. 2 illustrates a computing device 220 for detecting motion in a high resolution video in accordance with one or more embodiments of the present disclosure. Computing device 220 can be, for example, a laptop computer, a desktop computer, or a mobile device (e.g., a mobile phone, a personal digital assistant, etc.), among other types of computing devices.

As shown in FIG. 2, computing device 220 includes a memory 222 and a processor 224 coupled to memory 222. Memory 222 can be any type of storage medium that can be accessed by processor 224 to perform various examples of the present disclosure. For example, memory 222 can be a non-transitory computer readable medium having computer readable instructions (e.g., computer program instructions) stored thereon that are executable by processor 224 to detect motion in a high resolution video in accordance with one or more embodiments of the present disclosure.

Memory 222 can be volatile or nonvolatile memory. Memory 222 can also be removable (e.g., portable) memory, or non-removable (e.g., internal) memory. For example, memory 222 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 222 is illustrated as being located in computing device 220, embodiments of the present disclosure are not so limited. For example, memory 222 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for detecting motion in a high resolution video, comprising:
    dividing an image frame of a high resolution video into a number of blocks;
    determining whether motion is present in each of the blocks;
    identifying, within each block in which motion is determined to be present, pixels in which motion is present by applying a pixel based motion detection algorithm to each pixel of each block in which motion is determined to be present, wherein the pixel based motion detection algorithm is a kernel density estimation based motion detection algorithm;
    dividing a subsequent image frame of the high resolution video into a number of blocks corresponding to the number of blocks into which the image frame is divided;
    determining whether motion is present in the blocks of the subsequent image frame that correspond to the blocks of the image frame in which motion is determined to be present and blocks of the image frame adjacent to the blocks in which motion is determined to be present; and
    identifying, within each block of the subsequent image frame in which motion is determined to be present, pixels in which motion is present.

2. The method of claim 1, wherein the method includes marking the blocks of the image frame in which motion is determined to be present as seed blocks.

3. The method of claim 2, wherein the method includes:
    resetting the seed blocks after a particular number of subsequent image frames of the high resolution video; and
    determining whether motion is present in each block of an image frame of the high resolution video after resetting the seed blocks.

4. The method of claim 3, wherein the method includes marking the blocks of the image frame in which motion is determined to be present after resetting the seed blocks as new seed blocks.

5. The method of claim 1, wherein the method includes determining whether motion is present in each of the blocks of the image frame using a histogram based motion detection method.

6. The method of claim 1, wherein no further motion detection processing is performed on each block of the image frame in which motion is determined to not be present.

7. The method of claim 1, wherein each of the blocks of the image frame are a same size.

8. The method of claim 1, wherein the identified pixels in which motion is present comprise a foreground of the image frame.

9. The method of claim 1, wherein pixels in which motion is not identified to be present comprise a background of the image frame.

10. A computing device for detecting motion in a high resolution video, comprising:
    a memory; and
    a processor configured to execute executable instructions stored in the memory to:
        divide an image frame of a high resolution video into a number of blocks;
        determine whether motion is present in one or more of the blocks by applying a histogram based motion detection method to the one or more of the blocks;
        identify, within each block in which motion is determined to be present, pixels in which motion is present by applying a pixel based motion detection algorithm to each pixel of each block in which motion is determined to be present, wherein the pixel based motion detection algorithm is a kernel density estimation based motion detection algorithm;
        divide a subsequent image frame of the high resolution video into a number of blocks corresponding to the number of blocks into which the image frame is divided;
        determine whether motion is present in the blocks of the subsequent image frame that correspond to the blocks of the image frame in which motion is determined to be present and blocks of the image frame adjacent to the blocks in which motion is determined to be present; and
        identify, within each block of the subsequent image frame in which motion is determined to be present, pixels in which motion is present.

11. The computing device of claim 10, wherein the histogram based motion detection method includes:
    building a histogram model for each of the one or more of the blocks of the image frame; and
    comparing the histogram for each of the one or more of the blocks of the image frame to a histogram model for that block.

12. The computing device of claim 11, wherein:
    comparing the histogram for each of the one or more blocks of the image frame to the histogram model for that block includes:
        determining a distance between the histogram and the histogram model;
        increasing a weight of the histogram if the distance is below a particular threshold;
        decreasing the weight of the histogram if the distance is above the particular threshold; and
        if the weight of the histogram is below an additional threshold, updating the histogram model by replacing the histogram with a current histogram having a distance to the histogram model above the particular threshold;
    motion is present in a particular block if the distance between the histogram for the particular block and the histogram model is above the particular threshold; and motion is not present in the particular block of the distance between the histogram for the particular block and the histogram model is below the particular threshold.

13. The computing device of claim 11, wherein the histogram model for each of the one or more blocks of the image frame includes a number of histogram bin vectors, wherein each histogram bin vector has a weight.

14. The computing device of claim 10, wherein the processor is configured to execute the instructions to:
  maintain a histogram model for a block of the image frame if motion is determined to be present in the block;
  monitor the block for motion over time; and
  replace a background model for the block with the histogram model for the block if the block is marked as having motion for a fixed period of time.

15. A non-transitory computer readable medium having computer readable instructions stored thereon that are executable by a processor to:
  divide an image frame of a high resolution video into a number of blocks corresponding to a number of blocks into which a previous image frame of the high resolution video was divided, wherein one or more of the blocks into which the previous image frame was divided were determined to have motion present therein;
  determine whether motion is present in the blocks of the image frame that correspond to the blocks of the previous image frame determined to have motion present therein and blocks of the previous image frame adjacent to the blocks determined to have motion present therein; and
  identify, within each block of the image frame in which motion is determined to be present, pixels in which motion is present by applying a pixel based motion detection algorithm to each pixel of each block of the image frame in which motion is determined to be present, wherein the pixel based motion detection algorithm is a kernel density estimation based motion detection algorithm.

16. The computer readable medium of claim 15, wherein the instructions are executable by the processor to:
  divide a subsequent image frame of the high resolution video into a number of blocks corresponding to the number of blocks into which the image frame is divided;
  determine whether motion is present in the blocks of the subsequent image frame that correspond to the blocks of the image frame determined to have motion present therein and the blocks of the image frame adjacent to the blocks determined to have motion present therein; and
  identify, within each block of the subsequent image frame in which motion is determined to be present, pixels in which motion is present.

17. The computer readable medium of claim 15, wherein the instructions are executable by the processor to determine whether motion is present only in the blocks of the image frame that correspond to the blocks of the previous image frame determined to have motion present therein and blocks of the previous image frame adjacent to the blocks determined to have motion present therein.

18. The computer readable medium of claim 15, wherein the blocks of the previous image frame adjacent to the blocks determined to have motion present therein include the blocks of the previous image frame adjacent to sides and corners of the blocks determined to have motion present therein.

19. The computer readable medium of claim 15, wherein the instructions are executable by the processor to perform no further motion detection processing on each block of the image frame in which motion is determined to not be present.

* * * * *